Oct. 1, 1968  E. S. MONROE, JR  3,403,853

STEAM TRAP DESIGN AND METHOD

Filed June 30, 1966  2 Sheets-Sheet 1

INVENTOR
ELMER S. MONROE, JR.

BY *Harry E. Braddock*

ATTORNEY

Oct. 1, 1968  E. S. MONROE, JR  3,403,853
STEAM TRAP DESIGN AND METHOD
Filed June 30, 1966  2 Sheets-Sheet 2
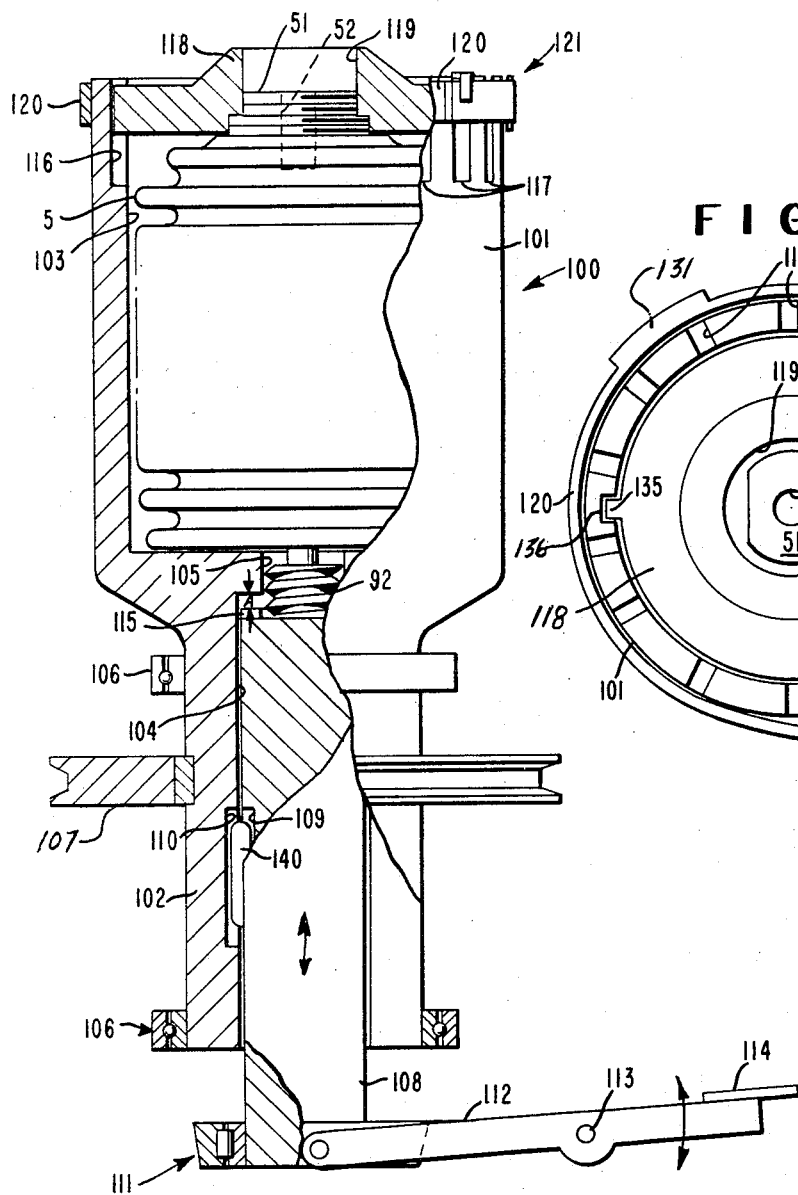
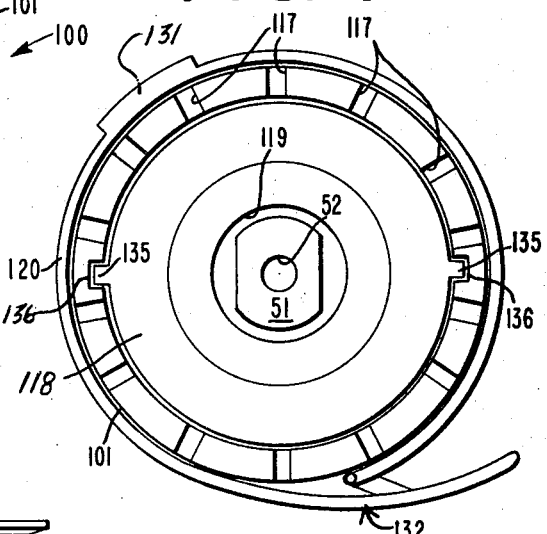
INVENTOR
ELMER S. MONROE, JR.
BY *Harry C. Braddock*
ATTORNEY

United States Patent Office 3,403,853
Patented Oct. 1, 1968

3,403,853
STEAM TRAP DESIGN AND METHOD
Elmer Sylvester Monroe, Jr., Newark, Del., assignor to E. I. du Pont de Nemours and Company, Wilmington, Del., a corporation of Delaware
Filed June 30, 1966, Ser. No. 561,769
5 Claims. (Cl. 236—56)

ABSTRACT OF THE DISCLOSURE

A liquid-filled bellows unit for actuation of a steam trap wherein the bellows unit is pre-stressed in elastic compression a predetermined amount to achieve a substantially constant trap actuation temperature excursion over a wide range of temperature-pressure steam trap operating conditions.

This invention relates generally to the field of devices which separate liquids from vapors, and which separate noncondensible gases from vapors in a system involving usually a valve unit actuated by a control means which in effect senses the heat content of the medium encountered and responds thereto to actuate the valve in a desired manner.

More specifically, this invention is concerned with an improved bellows or actuating unit for operating the valve element in such devices, or thermostatic steam trap assemblies as they are known. In addition the invention involves an improved method for fabricating the improved unit.

Conventional thermostatic steam trap assemblies utilizing metallic bellows units, are subject to certain serious limitations and disadvantages in use when operating at high pressures and temperatures and when operating at low pressures and temperatures. The bellows units currently available are somewhat fragile and can be damaged by suddenly applied pressure changes and "water hammer" conditions in the space surrounding the bellows unit. These limitations under such conditions have resulted in limiting the use of this type steam trap to low pressures less than 300 p.s.i. Other problems exist in these conventional steam trap assemblies, such as failures due to high stresses occurring in valve and valve seat elements created by the high closing forces which develop at higher operating pressure when the pressure suddenly drops as for example when a valve upstream of the steam trap is suddenly closed. Also, at lower pressures and temperatures, the bellows assemblies of conventional steam trap devices are rather slow to actuate the valve to closed position and do not generate sufficient closing pressure to maintain proper sealing engagement of the valve and valve seat. This results in undesirable loss of steam. In addition, conventional installations involve somewhat complicated and bulky structures or units departing from normal in-line conduit structure. Most prior art methods of manufacture require testing under actual operating conditions with subsequent adjustment of the trap devices to insure proper operation.

It is one object of this invention to provide a novel and improved bellows unit for steam trap assemblies which overcomes the limitations and disadvantages of the prior art units in that it possesses high reliability, long service life, the ability to function with this reliability and long life at operating pressures of about 600 p.s.i. and above, even under sudden pressure drops as mentioned in the preceding paragraph, and also functions properly at the lower temperatures and pressures.

It is another object of this invention to provide a simple, rugged, durable and reliable bellows unit for actuation of the assembly valve element.

It is a further object of this invention to provide an improved bellows unit for steam trap assemblies, as discussed above, which is of simple, economical design, effective and reliable in operation for long periods, and easy to manufacture, maintain, and repair.

It is a further object to provide an effective, improved, and novel method for fabricating and assembling in trap devices the improved valve actuating means of the invention, a method in which proper operation is insured without the need for testing under actual operating conditions or subsequent adjustment.

In general, the main objects of this invention are achieved by an improved actuating unit for operating a control element of a thermostatic trap device generally of the type which comprises a valve seat element, a valve element and a thermostatic actuating unit operatively connected to the one of said elements to actuate the element in accordance with the actuating unit action as the unit is exposed to varying temperatures, said improved unit comprising a hollow assembly having a wall structure defining an interior closed space, said wall structure comprising a portion movable to an extended configuration when said assembly is subjected to a temperature above a given limited temperature zone, and movable to a retracted configuration when said assembly is subjected to a temperature below said given zone, the closed space of said assembly being completely filled with a deaerated liquid when said assembly wall portion is in its retracted configuration, said assembly comprising resilient means cooperating with said movable wall portion, said resilient means of said assembly being maintained in a particular elastically deformed condition operative to urge said movable wall portion toward its extended configuration, and the method by which this arrangement is achieved and the trap device assembled.

Other objects and advantages will appear from a consideration of the following specification and claims taken in conjunction with the accompanying drawings in which:

FIGURE 3 is a partial general side elevation of one form of apparatus used to carry out the fabrication method of the present invention. Certain parts are shown in section to better illustrate the construction and functioning of the apparatus.

FIGURE 4 is a top view of the apparatus of FIGURE 3 taken at line 4—4.

Figure 1:
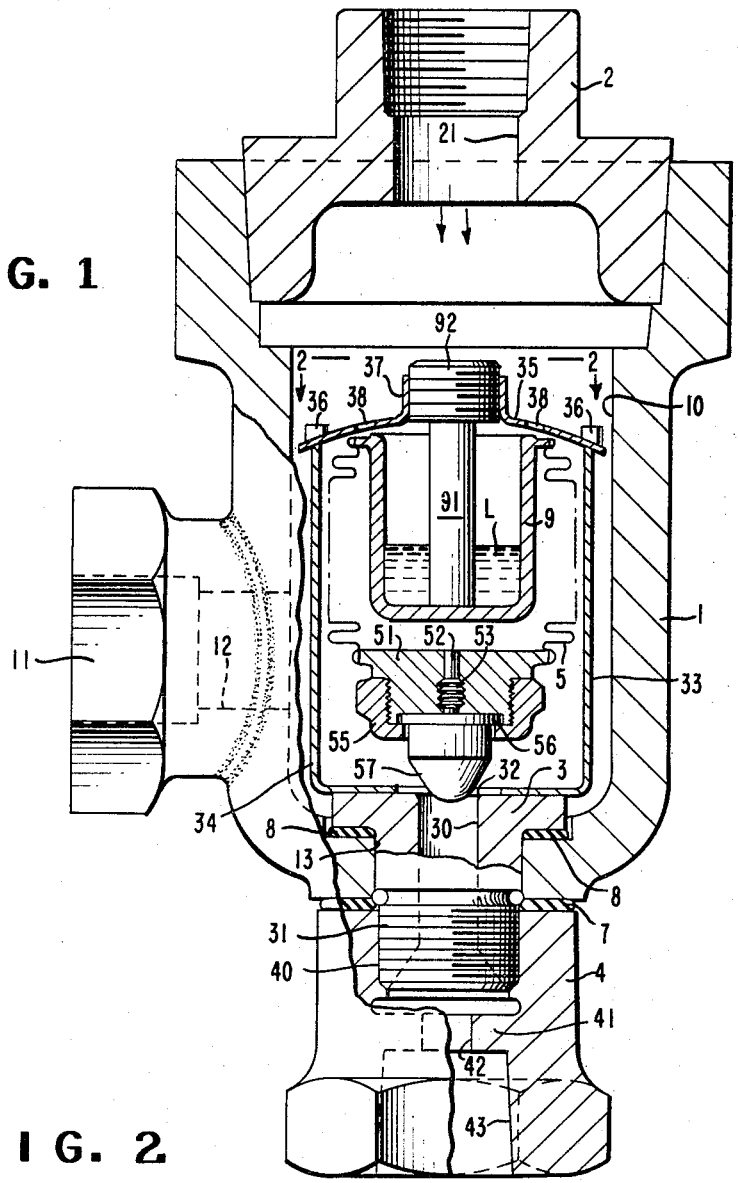
FIGURE 1 is a side elevational view of a thermostatic trap device embodying principles of this invention with portions broken away and shown in section to more clearly show the construction and arrangement of parts.
Figure 2:
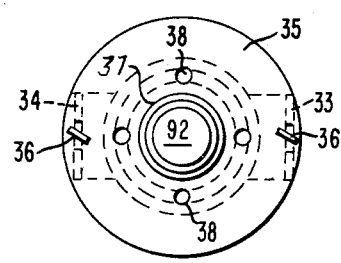
FIGURE 2 is a view of the removable bellows-valve unit of the device of FIGURE 1 taken at line 2—2 of FIGURE 1.

An illustrative improved steam trap device embodying features of this invention is shown in detail in FIGURES 1 and 2 of the drawings. An elongated outer casing or housing 1 is provided with an outlet and having an opening 13, a main inlet fitting 2 having an inlet passageway 21, and an alternate inlet 11 having a passageway 12. Both passageways are in communication with the hollow interior 10 of housing 1. For the purposes of this description, normal flow through the housing 1 is shown by the arrows in FIGURE 1.

A detachable subassembly unit is mounted in the hollow interior portion 10 of housing 1. This subassembly comprises in combination, a valve seat element 3, and a bellows unit for actuating the valve element 57, all linked together or operatively interconnected by frame structure as shown. The frame structure comprises a U-shaped bracket with upwardly extending arm portions 33 and 34, which bracket is secured by suitable means such as welding or brazing to the upper surface of the valve seat element 3 as shown in FIGURE 1. Valve seat element 3 is provided with a passageway 30 extending therethrough and a valve seat structure 32 arranged to cooperate with valve element 57. A substantially circular element 35 is secured in horizontally disposed position at the upper extremities of arm portions 33 and 34 as shown in FIGURE 1.

A vertically disposed shaft 91 having an upper enlarged externally threaded portion 92 is adjustably secured in an upwardly extending threaded sleeve portion 37 of element 35. Element 35 is secured in position by means of twisted lugs 36 formed in the upper ends of arm portions 33 and 34 and extending through suitable openings formed at opposed sides of element 35 as shown in FIGURES 1 and 2. Element 35 is provided with a number of circular openings 38 extending therethrough. A cup-like element 9 is secured to the lower end of shaft 91. Element 9 is an upper end closure element for hollow extensible bellows element 5 which is vertically disposed between upwardly extending arm portions 33 and 34. At the lower end of bellows element 5 is secured a lower end colsure element 51 which has a passageway 52 therethrough for the purpose of access to the interior portion 2 of the bellows assembly. Passageway 52 is sealed by a threaded plug 53. A valve member 54 provided with valve element portions 57 is clamped in position on lower end closure element 51 of the bellows assembly by apertured threaded cap element 55.

Valve seat element 3, as viewed in FIGURE 1, is provided with a downwardly extending threaded portion 31 fitted through lower opening 13 in housing 1. Threaded portion 31 of element 3 is received and secured in the threaded recess in the upper end of outlet element 4 as shown in order to secure the bellows unit in position in housing 1. Suitable sealing gaskets or rings 7 and 8 are provided as shown. Outlet element 4 is provided with an outlet passageway 43 which communicates with passageway 31 in valve rest element 3. The outlet passageway in element 4 preferably is provided with a restricted portion 42 formed by annular inwardly extending flange structure 41.

Restricted portion 42 of the outlet passageway acts to control flow through the assembly to reduce the pressure drop across valve seat 3 when in the open condition which reduces erosion on valve seat 3 and valve element 57. In addition, this reduced pressure drop results in a lower closing force on the seat and valve which contributes to prolonged operation at high pressures and temperatures without damage. The bellows assembly which comprises upper and lower closure portions 9 and 51 as connected by extensible corrugated tubular wall 5 may be of conventional thermostatic bellows construction. Preferably, however, the bellows assembly is completely solidly filled with a deaerated substantially incompressible liquid only, such that no air or gas remains in the extreme radial extremities of the annular corrugations. Such air or gas located or trapped in these locations renders the bellows material at such locations much more vulnerable to extreme working and deformations beyond its elastic limits when subjected to sharp or sudden pressure changes.

The preferred basic trap design and general method of fabrication additionally disclosed in my prior application Ser. No. 170,091, filed Jan. 31, 1962, now U.S. Patent No. 3,146,947, and Ser. No. 396,310, filed Sept. 14, 1964, now U.S. Patent No. 3,288,367.

Referring to FIGURE 1, the operation of the trap device is generally as follows: When the vapor, at operating temperature, entering the trap device and surrounding the bellows assembly brings the medium in the space inside the bellows to the same temperature as the vapor, then the pressure in the space inside the bellows assembly will be substantially the same as the pressure in the trap device surrounding the bellows assembly. Since under this condition the effective area of the lower or extensible end portion of the bellows assembly exposed to internal pressure tending to close the valve opening is greater than the effective area exposed to pressure tending to open the valve, the valve element 57 is maintained in closed position against the valve seat 32. Condensation of vapor to liquid in the trap and in reservoir element 9 at the temperature of the vapor will not change these conditions. However, heat transfer to lower temperature ambient surroundings outside the trap device through the walls of trap device housing 1 will cause temperature of the condensed liquid and trap interior to drop below operating vapor temperature. Although the ambient pressure outside the bellows assembly will not drop since its supply pressure is maintained, the pressure inside the bellows assembly will decrease since it is in a separate system. When the temperature and pressure inside the bellows assembly drop beyond a certain point, the external pressure on the surface of the bellows assembly tending to open the valve will prevail and cause the valve to open to the position shown in FIGURE 1. This action discharges condensate through the trap until vapor at its operating temperature again enters the space in the trap device surrounding the bellows assembly to heat the bellows interior to about the vapor operating temperature and close the valve again.

It has been found in conventional trap devices of this general nature that when a sudden reduction in pressure, at high temperatures, takes place in the space surrounding the bellows assembly, for example if a vapor supply valve upstream of the trap is shut off while the trap valve is open, or if the trap valve opens a short period after such supply valve is cut off, the high temperature and pressure inside the bellows assembly relative to conditions in the space surrounding it, cause the bellows to close the valve element against the valve seat very violently with great force and impact. This many times overstresses and damages the parts of the unit sufficiently to render the trap completely inoperative. A major portion of such damage is to the bellows corrugations causing them to deform and be overstressed. Such bellows deformation may take the form of "squirming" and causes not only nonalignment of seat and valve making trap inoperative but also may rupture the bellows. It has also been found in conventional trap devices that at the lower pressures and temperatures sometimes encountered, the conventional bellows assemblies are slow to actuate the valve elements to closed position and do not generate enough force to maintain proper sealing engagement between the elements. This results in costly and undesirable loss of steam.

Applicant has overcome these operating deficiencies of conventional traps and improved the normal opening and closing action of these traps by adding certain features, one of which involves providing a reservoir, such as is formed by element 9, to collect condensed vapor in a liquid pool in good heat exchange relationship to the bellows assembly when the trap valve is closed so that when the pressure outside the bellows assembly drops suddenly, with or without a temperature drop, the liquid will vaporize to remove heat energy from the bellows and its interior space to cool the same and reduce the violence of the valve closing action caused by the pressure drop, even when the vapor operating conditions involve very high pressures and temperatures. This bellows design of applicant has in fact prolonged trap and bellows operating life at high temperatures and pressures. Preferably, as shown in the drawings, the liquid reservoir extends into the bellows assembly interior space not only to get maximum heat transfer from the interior space to the liquid in the reservoir, but also to reduce the interior space to reduce in turn the stored internal energy and thermal expansion of the medium placed in the bellows assembly interior. The larger that the reservoir is made relative to the enclosed space within the bellows proper, up to a certain point, the greater will be its heat transfer surface for cooling the medium within the bellows and the smaller will be the stored internal energy of the medium inside the bellows proper requiring heat transfer to reduce the destructive forces within limits which will not destroy the operative parts of the trap.

In addition to the improvement described in the preceding paragraph, in applicant's preferred bellows or actuating unit, the movable portion 5 of the resilient wall structure which defines the interior closed space of the hollow bellows assembly, is maintained in a particular elastically deformed condition when said bellows unit is in its retracted position (shown in FIGURE 1) so that an additional force is developed urging the movable portion of the wall structure and the bellows unit toward its extended position. This force, of course, also urges the valve element 57 (which is operatively connected to the movable wall portion) toward its seat 32 and will, especially at low temperatures and pressures, cause the valve element to be closed more quickly when the temperature to which the unit is subjected increases through the limited temperature zone which causes extension of the bellows and closure of the valve elements. Also, it is preferred to establish and maintain an elastic deformation large enough to ensure, even at low temperatures and pressures, that sufficient force remains even when the bellows is extended and closing the valve elements to hold the valve elements together with enough force to ensure proper sealing engagement. It will be clear that both actions, speeding up closure of the valve elements and maintaining proper sealing engagement forces, will prevent undesirable steam losses as the temperature to which the unit is subjected increases through the limited temperature zone which results in closing the valve elements.

The elastically deformed condition of the bellows unit wall structure described in the preceding paragraph is preferably accomplished by following the method of manufacture generally described in my prior U.S. Patent No. 3,146,947 with certain modifications, and basically involves taking each of a plurality of resilient extensible bellows assemblies having different free lengths and spring rates, each of said assemblies comprising a wall structure defining an interior closed space, and a pasageway through said wall structure in communication with said space, said wall structure comprising a resilient portion movable between an extended position and a retracted position, then moving the resilient portion of the wall structure of each assembly toward the retracted position to elastically deform said portion a predetermined constant amount from its free length to create a reaction force urging it toward the extended position, and while maintaining the resilient portion in the deformed condition and retracted position, completely filling the space with a deaerated, or degassed, liquid and sealing the passageway to permit, below a certain temperature level, ambient pressure outside the wall structure to maintain said portion of said wall structure in its retracted position and maintain the deformation and reaction force urging said portion of said wall structure toward its extended position. Preferably the resilient portion of the bellows unit wall structure is elastically deformed by displacing it in compression from its free length, or dimension in the direction of retraction, a distance substantially equal to but no less than the distance the portion of the bellows unit wall structure will move in moving the valve element to which it will be connected from its retracted open position to closed position of engagement with the valve seat element. The small amount of difference in these distances, if any, will depend upon factors such as desired closing force to be exerted by the valve on the valve seat element and the spring rate or constant of the resilient wall portion. The details of the method of fabricating the bellows units and assembling them in trap devices may be more clearly understood when described in conjunction with FIGURES 3 and 4 of the drawings. In FIGURE 3 a rotating assembly comprising a cylindrical upper hollow cup portion 101 and a cylindrical lower hollow shaft portion 102, is shown mounted for rotation about a substantially vertical axis by means of upper and lower bearing units 106. A drive sheave or pulley element 107 is rigidly secured to the lower portion 102 for rotating the assembly by means of a drive motor and drive belt (not shown). The upper portion 101 of the rotating assembly is provided with a concentric chamber or bore 103 which receives a bellows unit as shown. The upper edge of the upper hollow cup portion 101, is provided with a plurality of axially extending circumferentially spaced slots 117, and a positioning cover element 118 which fits inside the upper portion of the hollow cup portion 101 as shown. The positioning cover element 118 is provided with a central aperture 119 which is contoured to engage and cooperate with the upper end of a bellows unit positioned in the chamber 103 of the cup portion 101 as shown in FIGURE 3. The vertical position of the cover element 118 will be determined initially by the free length of a bellows unit positioned in chamber 103. Cover element 118 may be secured in a vertical position by a clamping or locking ring assembly 121 comprising a circumferentially extending strap member 120 engaging the exterior of the upper slotted portion of cup portion 101 and an over-center ring locking toggle unit 132 as shown.

When the toggle unit 132 is actuated to its clamping or locking position, in a well-known manner, it will elastically distort the upper edge of cup portion 101 between slots 117 radially inwardly to engage and clamp the cover element 118 in its position. Strap member 120 is provided with a counterweight portion 131 which offsets the effects of the toggle unit 132 when the rotating assembly is being rotated. The cover element 118 is also provided with diametrically opposed guide lugs 135 which cooperate with guide slots 136 formed in the inner wall of cup portion 101 defining chamber 103.

The lower shaft portion 102 of the rotating assembly is provided with a central cavity or bore 104 which communicates with the chamber 103 in the upper portion 101 by means of a restricted opening 105 through which the enlarged externally threaded portion 92 of shaft 91 of the bellows unit positioned in chamber 103 extends, as shown. A rod member 108 is slidingly fitted and mounted in bore 104, relative rotation between these parts being prevented by opposed keyways 109 and 110 in which is fitted key element 140. Rod member 108 is moved axially within the bore 104 by means of a thrust bearing collar unit 111 and a cooperating actuating lever 112. It will be clear from the showing of FIGURE 3 that rod member 108 can be positioned by means of lever 112 which is pivoted at 113. A shim element 115 of selectively variable size is positioned at the upper end of the rod member 108. It will be seen that the thickness or height of the shim element 115 will determine how far upwardly the threaded portion 92 will be moved or deflected when the rod member 108 is moved upwardly into bore 104 by downward movement of element 114 on pivotal lever 112.

In operation an empty bellows unit is placed in the chamber 103 as shown in FIGURE 3. The cover element 118 is positioned to engage the upper portion of the bellows unit at its free length with lower portion of the unit, namely element 92 extending downwardly through opening 105. The cover element 118 is then secured in this position by locking ring assembly 121. The rotating assembly is then rotated rapidly by means of drive pulley 107 and the associated drive means not shown. The actuating lever 112 is pivoted to move rod member 118 axially into bore 104 to engage the bottom of element 92 and move it upwardly to compress the bellows unit until shim element engages the bottom of bore 104 after a predetermined amount of compression has occurred. While maintaining this predetermined amount of compression, a deaerated liquid such as water is supplied through central opening 119 in the cover element 118 and through filling passageway 52 into the interior of the bellows unit until the bellows is completely filled at which time a threaded closure element 53 is secured in place to seal the bellows unit in filled compressed condition. The rotation is stopped, rod member 108 retracted, cover element 118 unlocked and removed, after which the filled bellows unit is removed and the operation repeated.

The filled bellows is then assembled in a trap device such as that shown in FIGURE 1. With the bellows unit in its retracted, solidly filled condition, the distance between valve element 57 and valve seat 32 is adjusted by means of the threaded engagement between elements 92 and 35 until it is about equal to, but no greater than the predetermined distance from its free length than the bellows unit was compressed before filling and sealing. This will insure that proper functioning of the trap device will occur without need for further testing or adjustment, the trap operating properly when a given limited temperature zone is transversed, whether at high temperatures or pressures or at low temperatures and pressures. This method of fabrication and assembly is highly effective, simple, economical and reliable, which adapts it very well to high speed mass production techniques. The method handles bellows units of varying free lengths and spring rates, applying a constant predetermined degree of compression to each, and needing no testing or adjustment after the bellows unit has been installed in the trap device as described.

In steam trap devices of the invention the valve elements will be closed as long as the product of the pressure inside the bellows unit ($P_2$) times the interior effective cross-sectional area $$\left(\frac{\pi}{4} D_2^2\right)$$

of the unit subjected to this pressure is greater than the product of the pressure surrounding the bellows unit ($P_1$) times the effective exterior area $$\left[P_1\left(\frac{\pi}{4}\right)(D_2^2-D_1^2)\right]$$

of the unit subjected to this latter pressure if the effect of the bellows unit spring rate is negligible. If the bellows has an appreciable spring rate then the forces in balance at the point of opening of the valve elements are indicated by the following expression:

$$P_2\left(\frac{\pi}{4}\right)(D_2^2)=P_1\left(\frac{\pi}{4}\right)(D_2^2-D_1^2)-XK$$

where K is the bellows spring rate and X is the amount of compression of the bellows unit.

The relationship of the pressures and dimensions is indicated by the following expression, using the same terms:

$$\frac{P_2}{P_1}=\frac{D_2^2-D_1^2}{D_2^2}-\frac{XK}{(P_1)\left(\frac{\pi}{4}\right)(D_2^2)}$$

A steam trap unit embodying principles of the invention and having the following characteristics, operated consistently to open at 10° F. below the saturated steam temperature over an operating pressure range of from 1 to 1000 p.s.i.; by using the same combination of factors as indicated in the foregoing expressions, substantially any desired degree of subcooling (or extent of temperature zone to actuate valve elements) can be achieved:

Ratio of diameter of valve seat to bellows unit interior=0.31.

Bellows unit spring rate=118 lbs./in.

Bellows unit compressed 5/32″ from its free length, solidly filled with deaerated water and sealed, before installed in trap device with valve element to valve seat spacing of 4/32″ when bellows unit in retracted position.

It is believed clear that in accordance with the objects of the invention applicant has provided a method of trap device fabrication and a completed trap device combination with features which insure that at the lowest temperature and pressure operating conditions the combined spring force and internal bellows pressure force are sufcient to operate the valve and maintain adequate sealing engagement between the valve elements, yet at the highest temperature and pressure conditions the spring force and internal bellows pressure force are prevented, by the condensate reservoir features from becoming great enough to break or rupture the trap device structure.

It will be seen from the preceding discussion and description that applicant has provided an improved bellows unit and trap device with features which bring about more effective operation over a wide range of operating conditions, prolonged operating life, and significantly increased pressure and temperature limits. A novel method for fabricating the improved thermostatic actuating means and for assembling the same in a trap device has also been described. Other advantages and benefits are believed to be apparent.

It is believed that numerous modifications within the spirit of this invention will occur to those skilled in the art, and all such are considered to fall within the scope of the following claims.

What is claimed is:

1. An improved actuating unit for operating a control element of a thermostatic trap device generally of the type which comprises a valve seat element, said valve seat element having an orifice of given transverse cross-sectional area, a valve element, and a thermostatic actuating unit operatively connected to the one of said elements to actuate the element in accordance with the actuating unit action as the unit is exposed to varying temperatures, said improved unit comprising a hollow assembly having a wall structure defining an interior closed space, said wall structure comprising a portion movable to an extended configuration when said assembly is subjected to a temperature above a given limited temperature zone, and movable to a retracted configuration when said assembly is subjected to a temperature below said given zone, the closed space of said assembly being completely filled with a deaerated liquid when said assembly wall portion is in its retracted configuration, said assembly comprising another wall portion defining a reservoir for collecting and maintaining a body of condensate outside said assembly and in good heat exchange relationship with the deaerated liquid inside said assembly, said assembly further comprising resilient means cooperating with said movable wall portion, said resilient means of said assembly being maintained in an elastically deformed condition operative to urge said movable wall portion toward its extended configuration, said portion of said wall structure comprising an inner surface exposed to said liquid, said inner surface having a given effective cross-sectional area corresponding to said cross-sectional area of said valve seat orifice and constructed and arranged to develop a force tending to move said wall portion toward its extended position when the pressure in said closed space is increased relative to the pressure outside said wall structure, the elastically deformed condition maintained at a predetermined magnitude relative to the ratio of the effective cross-sectional area of the inner surface to the transverse cross-sectional area of the valve seat element orifice such that the extent of the given temperature zone remains substantially constant over a wide range of unit operating conditions from very low temperatures and pressures to very high temperatures and pressures.

2. The improved unit of claim 1 in which the elastically deformed condition of said resilient means is limited by position and construction of the cooperating structure so that the deformation is about zero when said wall portion is in its extended configuration.

3. An improved bellows unit for operating a valve element of a thermostatic trap device generally of the type which comprises a valve seat element, said valve seat element having an orifice of given transverse cross-sectional area, a valve element, and a thermostatic bellows unit operatively connected to actuate the valve element in accordance with the bellows unit action as said unit is subjected to varying temperatures, said improved bellows unit comprising an extensible bellows assembly having structure defining an interior closed space, said bellows assembly movable to an extended configuration when said assembly is subjected to a temperature above a given limited temperature zone, and movable to a retracted configuration when said assembly is subjected to a temperature below said given zone, the closed space of said assembly being completely filled with a deaerated liquid when said assembly is in its retracted configuration, a portion of said structure of said assembly maintained in an elastically deformed condition operative to urge said assembly toward its extended configuration and speed up movement of said assembly toward its extended configuration, said portion of said wall structure comprising an inner surface exposed to said liquid, said inner surface having a given effective cross-sectional area corresponding to said cross-sectional area of said valve seat orifice and constructed and arranged to develop a force tending to move said wall portion toward its extended position when the pressure in said closed space is increased relative to the pressure outside said wall structure, the elastically deformed condition maintained at a predetermined magnitude relative to the ratio of the effective cross-sectional area of the inner surface to the transverse cross-sectional area of the valve seat element orifice such that the extent of the given temperature zone remains substantially constant over a wide range of unit operating conditions from very low temperatures and pressures to very high temperatures and pressures, said pressures ranging from about 15 p.s.i. to about 1000 p.s.i.

4. An improved steam trap device comprising in combination; a support structure, a valve seat element carried by said support structure, said valve seat element having an orifice of given transverse cross-sectional area, a valve element and a thermostatic actuating unit carried by said support structure, said actuating unit operatively connected to one of said elements to maintain said valve element and said valve seat element in a first position in operative sealing engagement with each other when said actuating unit is subjected to a temperature above a given limited temperature zone, and to maintain said elements in spaced-apart positions when said actuating unit is subjected to a temperature below said temperature zone, said actuating unit comprising a hollow assembly having wall structure defining an interior closed space, said wall structure comprising a movable portion cooperating with said one of said elements to move said element relative to the other element to bring said elements into said first position of sealing engagement, and maintain said engagement, when the unit is subjected to a temperature above said given level, and to move said element relative to the other element to bring said elements into their spaced apart positions when the unit is subjected to a temperature below said given level, said closed space of said hollow assembly being completely filled with a deaerated liquid when said movable portion of said wall structure is in a position corresponding to the spaced apart positions of said elements and said unit is being subjected to a temperature below said given level, said movable portion of said wall structure being maintained in an elastically deformed condition operative to urge said movable portion and said one of said elements toward a position in which said valve and valve seat elements are in their positions of sealing engagement in order to speed up closing action of said valve elements when said unit is subjected to a temperature above said given zone, said portion of said wall structure comprising an inner surface exposed to said liquid, said inner surface having a given effective cross-sectional area corresponding to said cross-sectional area of said valve seat orifice and constructed and arranged to develop a force tending to move said valve elements toward their position of sealing engagement when the pressure in said closed space is increased relative to the pressure outside said wall structure, the elastically deformed condition maintained at a predetermined magnitude relative to the ratio of the effective cross-sectional area of said inner surface to the transverse cross-sectional area of the valve seat element orifice such that the extent of the given temperature zone remains substantially constant over a wide range of unit operating conditions from very low temperatures and pressures to very high temperatures and pressures.

5. The improved steam trap device of claim 4 in which said elastically deformed condition of said portion of said wall structure is controlled by suitable construction and arrangement of the cooperating structure so that a significant magnitude of elastic deformation remains when said elements are in engagement, which is operative to urge said elements together, and assist in maintaining effective sealing engagement, said pressures varying from about 1 p.s.i. to about 1000 p.s.i.

References Cited

UNITED STATES PATENTS

| 3,288,367 | 11/1966 | Monroe | 236—56 |
| 3,302,878 | 2/1967 | Fujiwara | 236—56 |
| 1,588,532 | 6/1926 | Eggleston | 233—56 |
| 1,816,142 | 7/1931 | Clifford | 236—56 |
| 1,946,756 | 2/1934 | Oberg | 29—1571 |
| 3,295,191 | 1/1967 | Gallagher | 29—1571 |

WILLIAM J. WYE, *Primary Examiner.*